United States Patent [19]

Monroe et al.

[11] Patent Number: 5,639,374

[45] Date of Patent: Jun. 17, 1997

[54] WATER-CONSERVING PRESSURE-MAINTAINING REVERSE OSMOSIS SYSTEM

[75] Inventors: Jerry B. Monroe, Peoria; John K. Hemingway, Phoenix, both of Ariz.

[73] Assignee: Premier Manufactured Systems, Inc., Phoenix, Ariz.

[21] Appl. No.: 156,861

[22] Filed: Nov. 19, 1993

Related U.S. Application Data

[63] Continuation of Ser. No. 906,666, Jun. 30, 1992, abandoned.

[51] Int. Cl.$^6$ ................................................. B01D 61/12
[52] U.S. Cl. ...................... 210/637; 210/137; 210/195.2; 210/257.2; 210/652; 210/805
[58] Field of Search ........................... 210/86, 90, 104, 210/110, 116, 136, 137, 194, 195.2, 257.2, 258, 416.1, 416.3, 637, 652, 741, 805

[56] References Cited

U.S. PATENT DOCUMENTS

| | | | |
|---|---|---|---|
| 3,630,378 | 12/1971 | Bauman | 210/257.2 |
| 3,726,793 | 4/1973 | Bray | 210/321.6 |
| 3,746,640 | 7/1973 | Bray | 210/652 |
| 3,786,924 | 1/1974 | Huffman | 210/258 |
| 4,156,621 | 5/1979 | Andrews et al. | 134/10 |
| 4,321,137 | 3/1982 | Kohler | 210/137 |
| 4,332,685 | 6/1982 | Nowlin et al. | 210/638 |
| 4,344,826 | 8/1982 | Smith | 203/2 |
| 4,610,605 | 9/1986 | Hartley | 417/269 |
| 4,626,346 | 12/1986 | Hall | 210/110 |
| 4,702,842 | 10/1987 | Lapierre | 210/651 |
| 4,808,287 | 2/1989 | Hark . | |
| 4,812,237 | 3/1989 | Cawley et al. | 210/605 |
| 5,006,234 | 4/1991 | Menon et al. | 210/136 |
| 5,122,265 | 6/1992 | Mora et al. | 210/257.2 |
| 5,203,803 | 4/1993 | Schoenmeyr | 210/416.3 |
| 5,282,972 | 2/1994 | Hanna et al. | 210/257.2 |

*Primary Examiner*—Joseph W. Drodge
*Attorney, Agent, or Firm*—Fuess & Davidenas

[57] ABSTRACT

A reverse osmosis water purification system in which the concentrate water normally produced by the process is not disposed of by routing it to a drain line or otherwise, but is redirected to the main water supply. The system includes the well-known components of a reverse osmosis membrane, pre-filters which are installed ahead of the reverse osmosis membrane, and an appropriate tank to store the purified water. In addition, the system includes a pump and associated pressure sensing device for increasing the pressure of the incoming non-processed water to the reverse osmosis unit, and a pipe to carry the concentrate water from the reverse osmosis unit to the incoming main water supply, be it either a cold or hot water line. Additionally included is a one-way check valve in the concentrate water line, and a sensing device in the purified water storage tank to turn the pump off whenever the quantity of water in the tank exceeds a predetermined amount.

4 Claims, 1 Drawing Sheet

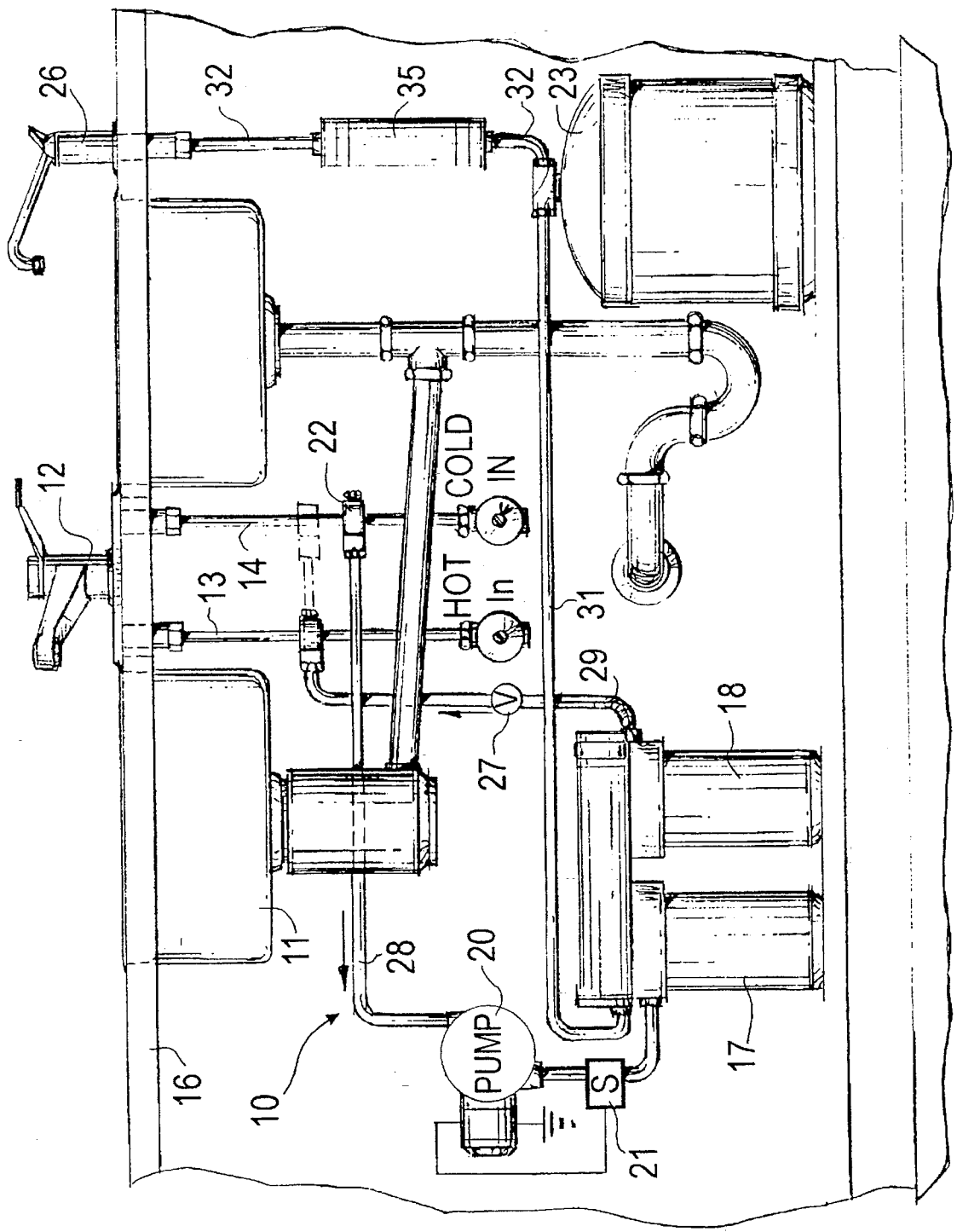

WATER-CONSERVING PRESSURE-MAINTAINING REVERSE OSMOSIS SYSTEM

This is a continuation of application Ser. No. 07/906,666 filed Jun. 30, 1992, now abandoned.

FIELD OF THE INVENTION

This invention relates to water purification equipment and more particularly to a reverse osmosis water purification system whereby the considerable amount of waste water which is normally produced by the reverse osmosis process can be saved and reused.

BACKGROUND OF THE INVENTION

The purification of water by reverse osmosis is a well known technology which is being used considerably more today than it was in the past due to increasing drinking water problems resulting from pollution, and the like. The increasing usage of this old technology has resulted in the development and refinement of systems which are economically and technically feasible for use in both domestic and industrial applications.

A typical reverse osmosis water purification and storage system currently used for home application employs a special diaphragm-type hydro-pneumatic storage tank into which the purified water from a reverse osmosis unit is stored. The special tank is provided with a diaphragm to divide it into a water storage compartment and a pre-pressurized air compartment. Pure water from the reverse osmosis unit is directed into the water storage compartment and, by diaphragm action, will compress the air in the pre-pressurized air compartment. When a demand for pure water occurs, the compressed air in the air compartment exerts a force on the diaphragm causing the water in the storage compartment of the tank to flow under the influence of that force through a plumbing line to an open fixture, usually a faucet. Systems are also available which employ a tank which stores the purified water at atmospheric pressure. A pump is included in the system to deliver water from the storage tank to the faucet.

When water is being purified by reverse osmosis, it will, in addition to producing purified water, produce a considerable amount of waste water as is well known. This production of waste water, which is a by-product of the reverse osmosis process, and which is also called concentrate water or reject water, has caused concern over the use of the reverse osmosis water purification technology wherever the supply of water to be purified is limited for whatever reason. For example, the ratio of concentrate or reject water to purified water can range from about 3:1 to about 15:1 depending on the particular system. This means that for every gallon of purified water produced, from 3 to 15 gallons is considered as concentrate water and customarily sent to a drain. This waste of water is of great concern particularly in drought areas of the world where water is a particularly precious commodity.

In Hall, U.S. Pat. No. 4,626,346, there is disclosed a reverse osmosis water purification system useful in limited water supply installations such as is found in recreational vehicles, boats and the like which use an unpressurized supply tank for the water source. According to the Hall patent, waste water from the reverse osmosis unit is recycled back to the supply tank to conserve water.

SUMMARY OF THE INVENTION

This invention provides a reverse osmosis water purification system whereby the considerable amount of reject or concentrate water which is normally produced by the process is not disposed of by routing it to a drain line or otherwise, but is redirected to the main water supply. More particularly, the reverse osmosis system of this invention is designed to be plumbed into an existing pressurized water supply such as from a municipal water system or from a well and to route the concentrate water from the process back to the pressurized water supply line.

The system includes the well-known components of a reverse osmosis membrane, pre-filters which are installed ahead of the reverse osmosis membrane, and an appropriate tank to store the purified water. In addition, the system includes a pump means and associated pressure sensing means for increasing the pressure of the incoming non-processed water to the reverse osmosis unit, means for directing the concentrate water from the reverse osmosis unit to the incoming main water supply (cold), or to a hot water line, the means for directing the concentrate water also including a one-way check valve, and means to sense the pressure of water in the storage tank to sense the pressure in the tank and turn the pump off whenever the pressure exceeds a predetermined value.

BRIEF DESCRIPTION OF THE DRAWINGS

FIG. 1 is a side elevational view of a typical installation of the reverse osmosis water purification system of this invention.

DESCRIPTION OF THE PREFERRED EMBODIMENT

Referring to FIG. 1, a reverse osmosis water purification system installed under a sink is shown. The system designated generally by the reference numeral 10 is shown in a typical installation, that is in a kitchen and under the sink where both cold and hot water supply lines are available. As shown, there are a pair of sinks 11 mounted in the counter top 16. Faucet 12 is supplied by cold water line 14 and hot water line 13. Attached to cold water line 14 is a saddle valve 22 which permits pressurized water from line 14 to be diverted through pipe 28, to pump 20 and ultimately to the reverse osmosis unit 19. The water in pipe 28 is under pressure as supplied by the municipality or well pump, customarily from about 30 to about 90 PSI. Prior to entering the reverse osmosis unit 19, the water is passed through preliminary filters 17 and 18 to remove relatively large foreign particles as is well known in the art. After passing through the preliminary filters the water is passed to the reverse osmosis unit 19 by means of piping which is not shown. As is well known, reverse osmosis unit 19 contains a membrane (not shown) which purifies water by the reverse osmosis process and has concentrate water as a by-product. The unit is also provided with pipe 29 which carries such concentrate water to either the hot water line 13 or the cold water line 14. Mounted in concentrate water pipe 29 is a one way check valve 27 which prevents the pressurized hot or cold water from back flowing to the reverse osmosis unit. The reverse osmosis unit is also provided with pipe line 31 which carries the purified water to the storage tank 23. Although not shown, storage tank 23 includes an elastomeric diaphragm which separates the interior of the tank into a water storage compartment and an air compartment which surrounds the water storage compartment. The air compartment is provided with pressurized air and this pressurized air serves to force water from tank 23 into pipe 32, through a final filter 25, usually activated carbon, and finally to faucet 26. It will also be understood that where a tank is used which stores the purified water at atmospheric pressure, then a pump is used to deliver water from the tank into pipe 32, through a final filter 25 and then to faucet 26. Such storage tanks are available from numerous sources. A typical tank for residential use has a water capacity of about 3 gallons and is pressurized at about 5–7 PSI. There are other types of storage tanks depending upon the application.

In order for a reverse osmosis system to function properly, there must be a differential pressure across the membrane of the unit. This is usually accomplished by the normal pressure of water from a municipal water supply or well in combination with a flow restricting device installed in the concentrate water line. This combination creates the necessary differential pressure across the membrane.

It is a feature of this invention that such flow restricting device can be eliminated from the system of this invention where the pressure of the water from the municipal water supply is at least about 30 PSI. Where the supply line pressure is less than about 30 PSI, then a flow restricting device is recommended to insure that proper differential pressure across the membrane is maintained. The necessary pressure differential across the reverse osmosis membrane is created by increasing the pressure of the incoming water to the reverse osmosis unit, allowing such water to be processed in the unit, and thereafter returning the concentrate water from the unit back to the main water supply, which of course is under pressure. In fact, use of a separate flow restricting device in the system of this invention at incoming water pressure over 40 PSI will render the system inoperative.

Thus it is a feature of the system of this invention that the concentrate water from the reverse osmosis unit be returned to the main water supply lines 13 or 14. To obtain proper water purification, the water to be purified must be obtained from the so-called "cold" water line 14. However, the concentrate water may be returned to either the cold water line 14 or the hot water line 13. It is also necessary that the pressure of the concentrate water in pipe or line 29 be greater than the water pressure in the cold or hot water lines 14 and 13. If the pressure in concentrate water were not greater, it would not be possible to inject the concentrate water in a supply line, such as hot water line 13 as shown in FIG. 1.

To accomplish this pressure increase, pump 20 is installed in line 28 along with a pressure sensing switch 21. The pressure sensing switch can be adjusted to varying pressures and functions to operate the pump when necessary to obtain optimal pressure increase. The amount of the pressure increase over the pressure normally present in the supply line is subject to several factors, including the normal supply line water pressure and the optimum water pressure for operation of the reverse osmosis unit 19. If the supply line pressure is within the range of the water pressure necessary to effectively operate the reverse osmosis unit, then the increase in pressure need be only enough to insure that the concentrate water is able to be injected back into the main supply line (cold) or the hot water line. Usually an increase of about 1–3 PSI is sufficient. However, where supply line pressure is considerably lower than that necessary to effectively operate the reverse osmosis unit, then the pressure should be increased to that required to effectively operate the reverse osmosis unit.

In order to prevent the possibility of concentrate water or unprocessed water from either of lines 13 or 14 from returning to the reverse osmosis unit 19 via line 29, a one way check valve 27 must be installed in concentrate water pipe 29. Additionally, when tank 23 is sufficiently charged with purified water an automatic shut off valve is employed to stop the flow of incoming purified water from the RO unit along with the sensing switch 21 which activates to shut off pump 20. Although not shown, if a hydro-pneumatic tank is used, a one-way check valve should also be installed in line 31.

From the foregoing it is apparent that the water purification system of this invention provides purified water which at the same time conserves the concentrate water by returning it to the main water supply, be it hot or cold. Returning the so-called "concentrate water" to the main water supply is a practical solution to the problem of high water useage. The concentrate water is mixed in and diluted with the incoming water and will be used for many other purposes such as hand washing, dishwashing, and the like.

We claim:

1. A water-conserving reverse osmosis water purification system usable with a water source that provides non-processed water under a first pressure, the system comprising:

(a) a reverse osmosis unit receiving non-processed water from the water source for producing, in response to a differential pressure between its input and its output, purified water and concentrate water therefrom;

(b) a non-processed water pipe means for conveying non-processed water from said water source to said reverse osmosis unit;

(c) a pump means, located within said non-processed water pipe means, for increasing the first pressure of said non-processed water by a second pressure of a magnitude that is individually sufficiently large so as to serve as the differential pressure across the reverse osmosis unit, the first and second pressures taken together jointly being, however, of a combined magnitude that is too large so as to serve as the differential pressure across the reverse osmosis unit;

(d) a concentrate water pipe means conveying concentrate water from said reverse osmosis unit to said water source that is said first pressure, said concentrate water pipe means including (d1) a check valve means for preventing water from flowing from said water source to said reverse osmosis unit, located in (d2) an unconstricted and unrestricted flow connection between the reverse osmosis unit and said water source at said first pressure, wherein the concentrate water from the reverse osmosis unit encounters during its conveyance the full and exact first pressure;

(e) a purified water storage tank;

(f) a purified water pipe means for conveying purified water from said reverse osmosis unit to said storage tank;

(g) a sensor means for sensing the amount of purified water in said storage tank; and (h) a control means responsive to said sensor means for shutting off said pump means when said storage tank contains a pre-determined amount of purified water;

(j) wherein the differential pressure appearing across the reverse osmosis unit is thus the difference between, on the one hand, the first and second pressures jointly, and, on the other hand, the first pressure;

(i) wherein the differential pressure appearing across the reverse osmosis unit is thus equal to the second pressure, which second pressure is of the magnitude individually sufficiently large so as to serve as the differential pressure across the reverse osmosis unit.

2. A water purification system comprising:

a water supply for providing water at a greater-than-atmospheric supply pressure;

a pump means, receiving water at the supply pressure from the water supply, for boosting the pressure of the received water above the supply pressure to which it is already pressurized by an amount equal to the sum of (i) a relatively larger, first, pressure that is of a magnitude that is individually sufficiently large so as to serve as a differential pressure between an inlet and any outlet of a reverse osmosis unit, plus (ii) a relatively smaller, second, pressure that is of a magnitude that is individually sufficiently large so as to serve as differential pressure causative of a flow of fluid within a conduit while simultaneously being individually too small so as to serve as the differential pressure of a reverse osmosis unit, wherein the sum of the first pressure and the second pressure is of a joint magnitude that is too large so as serve as the differential pressure of the reverse osmosis unit;

a reverse osmosis unit, receiving at an inlet water at the boosted supply pressure from the pump means, for processing by reverse osmosis the received water while incurring a pressure drop equal to the first pressure so as to produce from the received water both (i) purified water at a one, first outlet and (ii) waste water at another, second, outlet;

wherein the waste water at the second outlet of the reverse osmosis unit is, despite incurring the pressure drop equal to the first pressure between the inlet and the outlets of the reverse osmosis unit, still at a second outlet pressure that equals the sum of the supply pressure plus second pressure, and which second outlet pressure is thus greater than the supply pressure;

a conduit means for conveying the waste water at the second outlet pressure from the second outlet of the reverse osmosis unit to said water supply in response to a pressure differential that is equal to the second pressure therebetween;

a threshold sensor of the supply pressure; and means for controlling the pump means so that it boosts the supply pressure by the sum of the first pressure and the second pressure when the sensed supply pressure is below a threshold sensed by the sensor;

wherein a difference in water pressure across the reverse osmosis unit between its inlet and its second outlet equals the first pressure, and is thus of a proper magnitude to serve as the pressure across the reverse osmosis unit;

wherein the waste water that is produced by the reverse osmosis unit is returned to the water supply under the differential pressure that is equal to the second pressure despite the fact that the water supply is at a greater-than-atmospheric pressure;

wherein water is conserved.

3. A method of recycling waste water from a reverse osmosis unit that produces both purified water and waste water, the method comprising:

receiving into a pump supply water, from a source that is pressurized to a supply pressure greater than atmospheric pressure, and increasing in the pump the pressure of the received supply water by the sum of (i) a first pressure that is of a magnitude individually sufficiently large so as to serve as a differential pressure across a membrane of a reverse osmosis unit, plus (ii) a second pressure that is of magnitude individually sufficiently large so as to serve to force water through a conduit, therein by the sum of the first pressure and the second pressure to produce an increased pressure that is of a magnitude too large to serve as the differential pressure across a reverse osmosis unit;

receiving in the reverse osmosis unit the supply water at the increased pressure from the pump, and processing the received water so as to produce both (i) purified water at a purified water outlet, and also (ii) waste water at a waste water outlet, while incurring a pressure drop equal to the first pressure;

threshold sensing the supply pressure; and enabling the increasing in accordance with the threshold sensing;

wherein the increased pressure is maintained greater than a threshold pressure level despite variations in the supply pressure;

wherein each of the purified water and the waste water is produced at a pressure that is, although less than the increased pressure, still greater than the supply pressure by the magnitude of the second pressure; and flow-connecting the waste water at a pressure greater than the supply pressure from the reverse osmosis unit directly without flow restriction or constriction to the source of water at its supply pressure, wherein by the direct connection any reverse pressure that tends to counteract flow which is experienced by the waste water is precisely and exactly the supply pressure, and no greater nor any less pressure;

wherein the differential water pressure across the reverse osmosis unit is the first pressure;

wherein the waste water produced by the reverse osmosis unit is returned under the second pressure to the source of water that is at the supply pressure;

wherein water is conserved.

4. A method of recycling waste water from a reverse osmosis unit that produces both purified water and waste water, the method comprising:

receiving into a pump supply water from a source that is pressurized to a supply pressure in the range of 20 to 150 PSI, and increasing in the pump the pressure of the received supply water by the sum of (i) a first pressure that is of a magnitude individually sufficiently large so as to serve as a differential pressure across a membrane of a reverse osmosis unit, plus (ii) a second pressure that is of magnitude individually sufficiently large to serve to force water through a conduit, therein by the sum of the first pressure and the second pressure to produce an increased pressure that is greater than the supply pressure by from 39 to 89 PSI, and that is of a magnitude too large to serve as the differential pressure across a reverse osmosis unit;

receiving in the reverse osmosis unit the supply water at the increased pressure from the pump, and processing the received water so as to produce both (i) purified water at a purified water outlet, and also (ii) waste water at a waste water outlet, while incurring a pressure drop equal to the first pressure;

threshold sensing the supply pressure; and enabling the increasing in accordance with the threshold sensing;

wherein the increased pressure is maintained greater than a threshold pressure level despite variations in the supply pressure;

wherein each of the purified water and the waste water is produced at a pressure that is, although less than the increased pressure, still greater than the supply pressure by the magnitude of the second pressure; and flow-connecting the waste water at a pressure greater than the supply pressure from the reverse osmosis unit directly without flow restriction or constriction to the source of water at its supply pressure, wherein by the direct connection any reverse pressure that tends to counteract flow which is experienced by the waste water is precisely and exactly the supply pressure, and no greater nor any less pressure;

wherein the differential water pressure across the reverse osmosis unit is the first pressure;

wherein the waste water produced by the reverse osmosis unit is returned under the second pressure to the source of water that is at the supply pressure;

wherein water is conserved.

\* \* \* \* \*